UNITED STATES PATENT OFFICE.

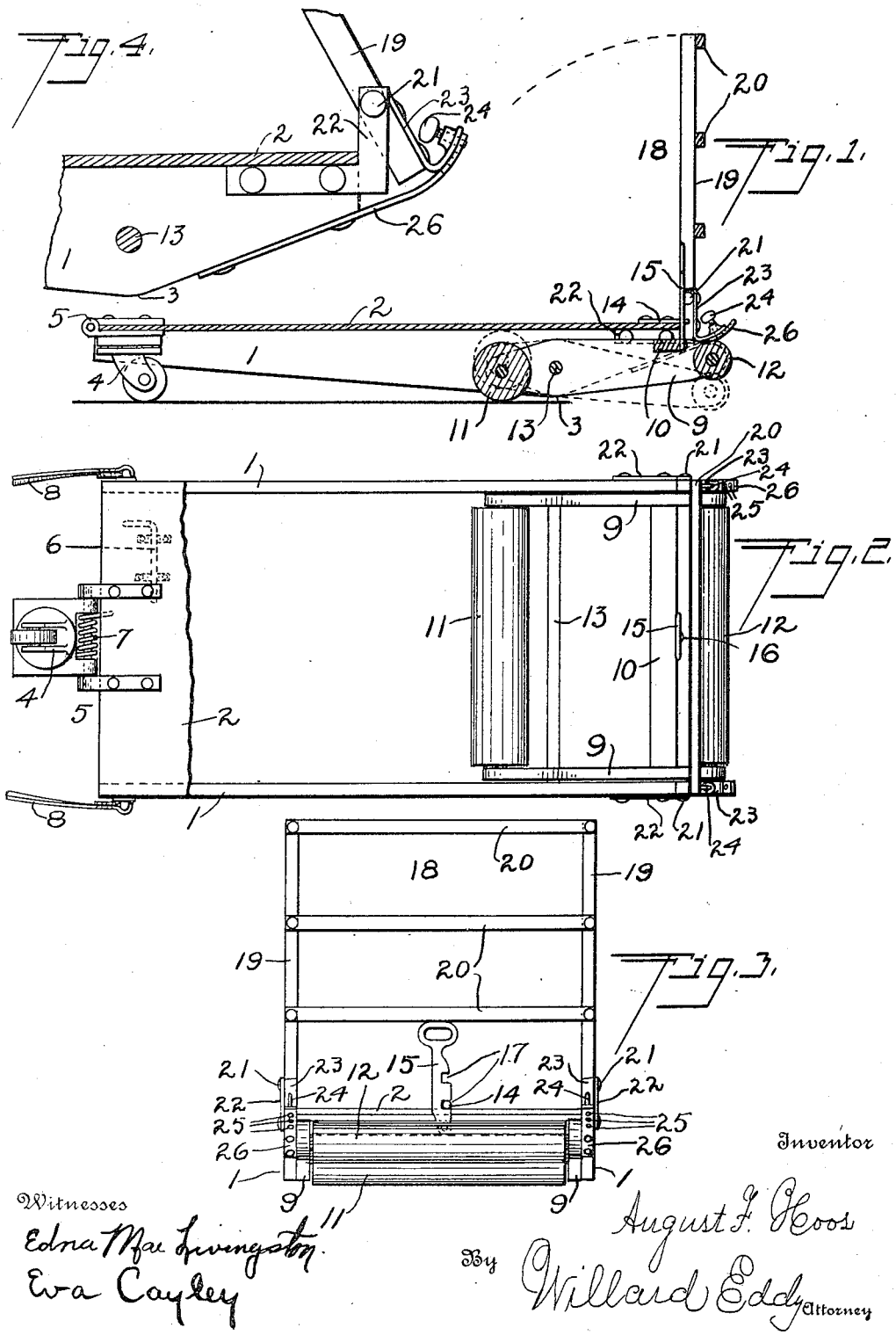

AUGUST F. HOOS, OF SOUTH OMAHA, NEBRASKA.

TRUCK.

1,069,653.

Specification of Letters Patent.

Patented Aug. 5, 1913.

Application filed October 21, 1912. Serial No. 726,873.

*To all whom it may concern:*

Be it known that I, AUGUST F. HOOS, of the city of South Omaha, county of Douglas, and State of Nebraska, have invented certain new and useful Improvements in Trucks, and have described the same in the following specification, illustrated by the accompanying drawings.

My invention relates to that class of trucks which are operable by hand and are adjustable to go on level floors or to go up and down stairs, as occasion may require.

It is the object of the invention to cause the truck to move easily and smoothly from floor or landing to stairs, and the reverse; to facilitate such adjustments as are necessary in order that the truck may travel operatively in the required course, either horizontal or sloping; to hold the load steady on the truck, especially in ascending and descending; to avoid jolting in passing over consecutive stair treads; and in general to produce a superior truck of the specified class. To this end I incorporate in my improved truck a sled having side runners to slide up and down stairs, an undertruck having front and rear ground rollers, a transverse horizontal pivot by which the sled and undertruck are coaxially united, and a stop frame hinged to the sled.

In the drawings, which show the best manner in which I have contemplated applying the principles of the invention, Figure 1 is a vertical longitudinal section of a truck constructed in accordance with these principles. Fig. 2 is a plan of the same—a portion of the sled being removed. Fig. 3 is a rear elevation of the same illustrative truck. Fig. 4 is an enlarged detail from Fig. 1.

The sled shown in the drawings has two duplicate parallel runners 1 and the connecting floor 2, which is nailed down across the straight top edges of the runners. In side elevation each of these runners has a tapering form, being vertically deepest at a convenient point 3 back of the middle of the runner, and being beveled underside from that point to both ends on straight lines forming with each other an obtuse angle denoted by the same numeral 3. The caster 4, fastened to the front end of the sled by the strap hinge 5, is swung by hand into the working position shown in Fig. 1, and is set in that position, when necessary, by manipulation of the catch bolt 6; at other times it is impelled by the spring 7 to the inoperative position shown in Fig. 2. Attached to the front end of the sled is a strap 8, or other means of traction, to be grasped by hand for the purposes of lifting the front end of the sled and of drawing the entire apparatus forward.

The undertruck shown in the drawings, comprises a flat rectangular frame having the side rails 9 spaced by the crossbar 10 to oscillate in the space between the runners 1. It also comprises two carrying-wheels, or rollers, namely, the larger roller 11 and the smaller roller 12, which are journaled transversely in the front and rear ends of the frame respectively. It is fastened to the sled by the transverse pivot pin 13, which passes through the runners 1 within or near the angle 3, and through the side rails 9 at points between the rollers. Relatively to the sled, the undertruck is set alternatively in either of the two positions shown in the drawings by means of a hand-operated latch. The latter comprises the pin 14 projecting back from the floor 2, and the latch-bar 15, which is attached to the crossbar 10 by the pivot pin 16, and has two notches 17 unequally distant from that pivot.

At the rear end of the machine is erected the adjustable stop frame 18. This frame, being of general plane and rectangular form, comprises the side bars 19 and the cross-pieces 20, and is hinged to the sled by the two horizontal and alining pivot pins 21, which project in opposite directions from the side bars 19 respectively into the angle-plates 22 on the runners 1. It is adapted in its different pivotal positions to stop and to steady the various loads, such as trunks, stoves and the like, which may be carried on the floor 2; it is especially adapted to engage for that purpose the body or top portion of a stove of the base-burner type, riding up or down stairs. It is also adapted to move or regulate the conveyance under the hand of the truckman behind. To control the pivotal position of this frame, and thereby to steady the load by contact therewith and prevent the same from tipping or sliding backward on the sled floor, each of the side bars 19 is provided with a bent and curving plate 23 and the setscrew 24 working therein, while the adjacent runner 1 carries a similarly curved and contacting catch-plate 26 having holes 25 to accommodate the points of the setscrews. By manipulation of the latter the stop frame is set at any desired or necessary angle of inclination to the floor 2, as shown in Fig. 4.

This improved truck is advantageously operated by two workmen together, one to manipulate the strap 8, and the other to make the necessary pivotal adjustments of the stop frame and of the undertruck. When the caster has been fastened in its carrying position by the bolts 6, and the disappearing roller 11 has been set in the rolling position shown in full lines in Fig. 1, the truck is adjusted to move on a level surface, and is supported thereon by the caster and that roller exclusively, and by that roller mainly, as shown in that figure. This adjustment of the main roller is effected by causing the latchbar 15 to engage the latchpin 14 in the position shown in Fig. 3. When moving up or down stairs, clear of floors and landings, the apparatus is supported by the runners 1, which slide smoothly on and across the front edges of the stair treads, several at once, the caster having been previously released by the bolt 6 and swung by the spring 7 into the inoperative position shown in Fig. 2, and the undertruck, with its disappearing roller 11, having been secured by the latchbar 15 in the position shown by broken lines in Fig. 1.

While being moved from a floor or landing to stairs above, the front end of the vehicle is first lifted and supported by the strap 8 in the hand of a truckman in front, is then rested for an instant upon a low step of the stairs, and is then lifted by the strap and rested upon a higher step alternately, as the sled is intermittently pulled and lifted forward; at the same time the rear end of the ascending vehicle is carried by the undertruck. By obvious adjustments of the same kind, the apparatus is made movable from a landing to stairs below, and from stairs to an adjoining horizontal floor, either below or above, in a manner equally smooth and free from jolting.

I claim as my invention—

1. A truck of the specified class, comprising a load-carrying sled having runners, an undertruck having a rigid frame and terminal rollers, a pivot coaxially connecting the sled with the undertruck, and means for pivotally adjusting the sled and the undertruck relatively to each other.

2. A truck of the specified class, comprising a load-carrying sled having longitudinally disposed side runners for sliding, an undertruck having a unitary frame and transverse terminal rollers for carrying, a transverse pivot uniting the runners with the undertruck, and means for holding the sled and the undertruck in different angular positions of pivotal adjustment.

3. A truck of the specified class, comprising a load-carrying sled having longitudinally disposed sliding runners, a caster hinged to the front of the sled, an undertruck having a unitary frame and transverse separated rollers, a transverse pivot coaxially connecting the sled with the undertruck, and means for adjusting the sled and the undertruck in different pivotal positions.

4. A truck of the specified class, comprising a load-carrying sled having parallel sliding runners, a removable caster under the front end of the sled, an undertruck having transverse terminal rollers, a transverse pivot pin connecting the sled with the undertruck, a latch between the sled and the undertruck, and draft mechanism attached to the forward end of the sled.

5. A truck of the specified class, comprising a load-carrying sled having tapering runners, an undertruck having front and rear rollers, and means for pivotally adjusting the undertruck; the front roller of the undertruck being adapted alternatively to reach below the runners and to disappear between the same, according to the pivotal adjustment of the undertruck.

In testimony whereof I hereunto set my signature in the presence of two witnesses.

AUGUST F. HOOS.

Witnesses:
 WILLARD EDDY,
 EVA CAYLEY.

Copies of this patent may be obtained for five cents each, by addressing the "Commissioner of Patents, Washington, D. C."